US012651271B2

(12) United States Patent
Stratton et al.

(10) Patent No.: US 12,651,271 B2
(45) Date of Patent: *Jun. 9, 2026

(54) AUTOMATED LEARNING OF MODELS FOR DOMAIN THEORIES

(71) Applicant: Neustar, Inc., Reston, VA (US)

(72) Inventors: Robert Stratton, San Francisco, CA (US); Dirk Beyer, San Francisco, CA (US)

(73) Assignee: NEUSTAR, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,877

(22) Filed: Aug. 7, 2024

(65) Prior Publication Data

US 2025/0037153 A1 Jan. 30, 2025

Related U.S. Application Data

(63) Continuation of application No. 15/256,568, filed on Sep. 3, 2016, now Pat. No. 12,079,825.

(51) Int. Cl.
| | |
|---|---|
| *G06Q 30/00* | (2023.01) |
| *G06N 3/00* | (2023.01) |
| *G06N 3/123* | (2023.01) |
| *G06N 20/00* | (2019.01) |
| *G06Q 10/00* | (2026.01) |

(Continued)

(52) U.S. Cl.
CPC ......... *G06Q 30/0201* (2013.01); *G06N 3/123* (2013.01); *G06N 20/00* (2019.01); *G06Q 10/067* (2013.01)

(58) Field of Classification Search
None
See application file for complete search history.

(56) References Cited

U.S. PATENT DOCUMENTS

| | | |
|---|---|---|
| 2002/0107858 A1 | 8/2002 | Lundahl et al. |
| 2004/0254901 A1 | 12/2004 | Bonabeau et al. |
| 2004/0267676 A1 | 12/2004 | Feng et al. |

(Continued)

FOREIGN PATENT DOCUMENTS

| | | |
|---|---|---|
| GB | 0110810 | 6/2001 |
| GB | 2375211 A | 11/2002 |

OTHER PUBLICATIONS

D. Henclewood, W. Suh, M. Rodgers, M. Hunter and R. Fujimoto, "A case for real-time calibration of data-driven microscopic traffic simulation tools," Proceedings of the 2012 Winter Simulation Conference (WSC), Berlin, Germany, 2012, pp. 1-12 (Year: 2012).*

*Primary Examiner* — Matheus Ribeiro Stivaletti
(74) *Attorney, Agent, or Firm* — Sterne, Kessler, Goldstein & Fox P.L.L.C.

(57) ABSTRACT

A computer implemented system and process to determine a model for a domain includes identifying a schema that defines a possible causal element of a particular type of behavior. One or more concepts are determined, as well as one or more sub-concepts for each concept, where each concept and sub-concept are associated with a logical relationship. Multiple models are determined from the one or more concepts and the one or more sub-concepts. The multiple models may be calibrated using representative data collected from a real-world source. An optimal model is determined amongst a plurality of calibrated models.

14 Claims, 4 Drawing Sheets

Determine Model Selection Process Fails To Meet A Termination Criterion 310

Determine Alternative Stack Of Models M1, M2, M3, M4 320

Implement Cross-Over Model Combination Process (M1) 322

Implement Mutation Process (M2) 324

Create new Dataset M3 Containing The Top Model From Calibrated Set (M3) 326

Make New Data Set From Random Models 328

Determine Best Model 330

(51) Int. Cl.
    *G06Q 10/067*     (2023.01)
    *G06Q 30/0201*     (2023.01)

(56)             References Cited

U.S. PATENT DOCUMENTS

| | | |
|---|---|---|
| 2005/0075832 A1 | 4/2005 | 1keguchi et al. |
| 2011/0066490 A1 | 3/2011 | Bassin et al. |
| 2011/0093249 A1 | 4/2011 | Holmes et al. |
| 2012/0069131 A1 | 3/2012 | Abelow |
| 2013/0290223 A1 | 10/2013 | Chapelle et al. |
| 2014/0195339 A1* | 7/2014 | Paulsen .............. G06Q 30/0247 |
| | | 705/14.46 |
| 2015/0254421 A1 | 9/2015 | Bateman et al. |
| 2015/0331963 A1 | 11/2015 | Barker |
| 2016/0034927 A1 | 2/2016 | Grushka |
| 2016/0203509 A1* | 7/2016 | Sharp, III .......... G06Q 30/0244 |
| | | 705/14.43 |
| 2016/0209544 A1 | 7/2016 | Minguez et al. |
| 2016/0242690 A1 | 8/2016 | Principe et al. |
| 2017/0180399 A1* | 6/2017 | Sukhomlinov ..... H04L 63/1425 |
| 2017/0323233 A1 | 11/2017 | Bencke et al. |
| 2018/0053114 A1* | 2/2018 | Adjaoute ................. G06N 3/02 |
| 2018/0068323 A1 | 3/2018 | Stratton et al. |
| 2018/0165554 A1 | 6/2018 | Zhang et al. |

* cited by examiner

AUTOMATED LEARNING OF MODELS FOR DOMAIN THEORIES

CROSS-REFERENCE TO RELATED APPLICATIONS

This application is a continuation of U.S. application Ser. No. 15/256,568, filed on Sep. 3, 2016, the contents of which is incorporated by reference herein in its entirety.

BACKGROUND

Marketing managers are often required to make decisions about the marketing instruments that they are using on an ongoing basis, often in complex and dynamic commercial environments. These decisions may involve identifying possible courses of action and choosing between them, and can involve many attributes, including amongst others, changes to product features, price and advertising deployment. These and other instruments are often called the marketing mix—variables which a marketing manager can use to influence a brand's sales. The impact of different instruments in the mix may be variable, and each brand may have a unique sensitivity to consumer response to its marketing action.

In order to maximize their return from their marketing investment, companies need to have knowledge of the consumer behavior that generates sales and, be able to analyze the impact of their own actions on these behaviors to formulate the levels or combination of these variables to maximize sales or profit. One way of identifying the impact of previous policy decisions and their associated actions is to look at how consumers have responded to these actions historically. This involves separating the contributions of such instruments to sales or other metrics of interest, and calculating the impact and ultimately the profitability of using them. Policy makers are then able to use these calculations to revise their plans in order to help them achieve their goals. Analysis is typically carried out using a combination of historical time series data and some type of statistical modelling approach, often involving a form of regression, under the assumption that the results allow practitioners to predict how consumers might respond in the future and therefore how best to plan their marketing.

A number of trends are driving an increase in the use of automated marketing analytics systems to aid decision making, including: the availability of granular consumer-level data and the ability to customize the delivery of advertising to individual consumers, the requirement for faster reaction times to maintain competitive advantage—especially in online marketing environments; the increasing volumes of real time data available to fuel decisions; an increasing focus on return on investment from marketing activities; a proliferation of digital media channels; and shorter product life cycles.

The quality of the analysis and the effectiveness of advertising delivery depends on the quality of the underlying assumptions on consumer behavior. In many solutions, consumer behavior is described through mathematical/statistical models derived from historical data about consumer behavior. Today, the process of deriving these models heavily involves human analysts for model setup and quality control. As a result, high-quality models cannot be built with high frequency and human analysts will inevitably be familiar with the data and the resulting models, potentially raising privacy concerns.

DETAILED DESCRIPTION

Figure 1:
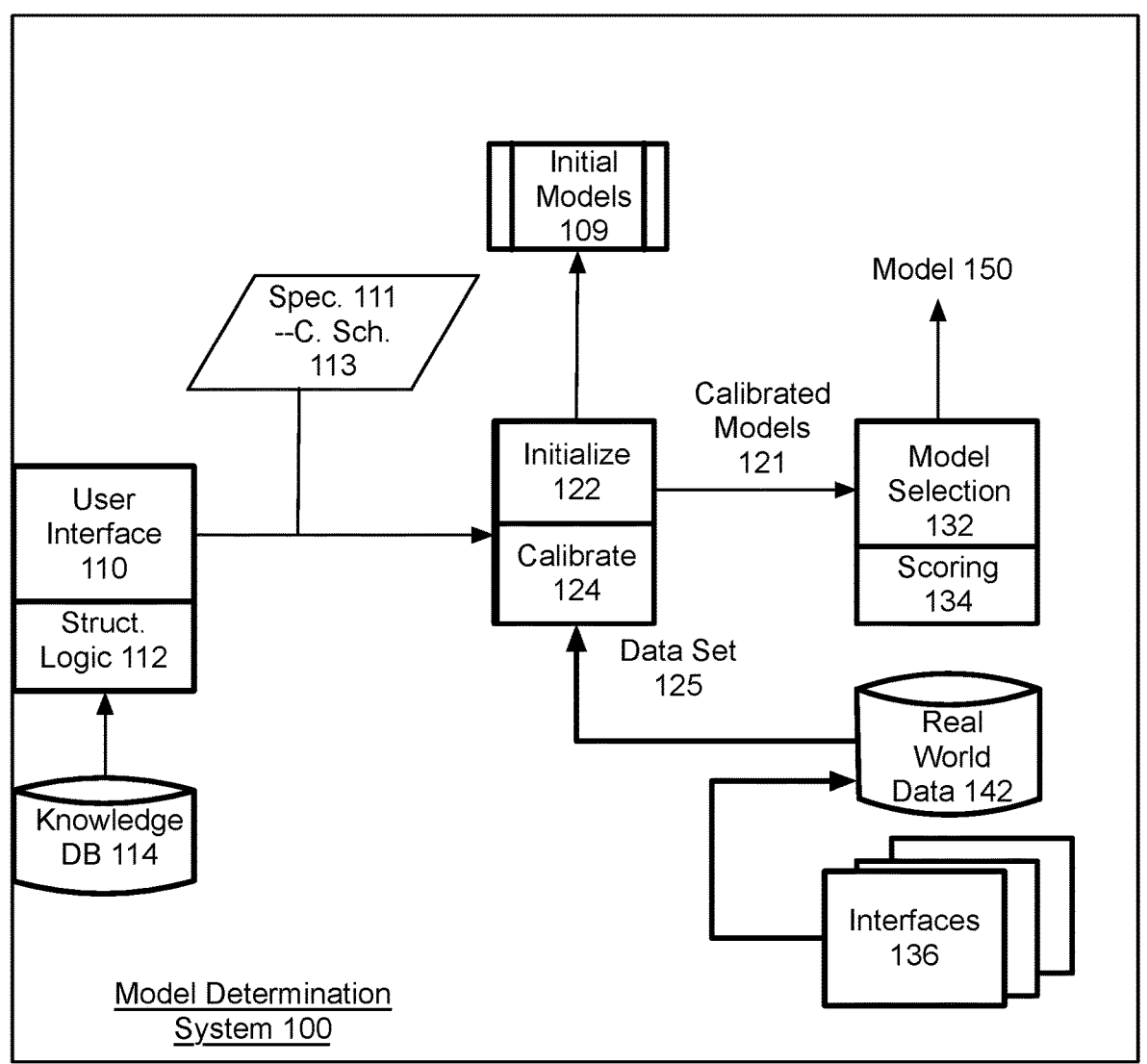
FIG. 1 illustrates an example model learning system for determining an optimal model for a domain target.

Examples provide a computer system in which a user can develop a model to predict or otherwise understand a relationship between one or more domain-specific outcome metrics and determinants (or causes) for such outcomes.

Examples include a system and method which analyze and determine a relative performance of different marketing instruments models using ontologies or schema to facilitate and improve processing. Among other benefits examples provide for the use of first order logic and machine learning methods—discrete and numeric optimization—to learn about the underlying consumer behavior that forms the data generating processes in a consumer market, subject to user configuration.

In some variations, a computer system can operate to determine an optimal model for a particular domain while maintaining a data for calibrating the model segregated or inaccessible to use from an operator.

According to some examples, a system is provided to automatically create a model to describe a relationship between an outcome and causal inputs, where the model is to conform to a set of prior knowledge about how the inputs affect the outcomes because of a domain theory. The domain theory may include or correspond to, for example, knowledge of consumer behavior or of physical processes describing the input/output relationship. In this way, examples leverage and combine machine-learning or random search methods with statistical estimation.

Among other benefits, examples include a system that can generate high-quality, plausible models without iterative human intervention. In such examples, a system can build these models in a privacy and data usage rights preserving way as no human needs to examine the data used for calibration of the models themselves.

In some examples, a computer system can determine an optimal market response model. Still further, in some examples, a computer system can be operated by a user to generate one or more optimal models which are tailored specifically for a particular domain or purpose, such as: (i) measurement of marketing effectiveness, (ii) selecting activities and consumers for targeted advertising, and (iii) determining the next best advertising impression to expose a specific consumer to.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

System Description

FIG. 1 illustrates an example model determination system for determining an optimal model for a domain target. A model determination system 100 may be implemented on a computer system to interact and receive inputs from a user. Among other benefits, the system 100 operates to create models describing the relationship of actions (e.g. marketing stimuli) to outcomes (e.g. purchase probability) that conform to known theories about an action-Outcome relationship. Additionally, examples provide for the determination of a model that meets statistical model goodness criteria (e.g. fit against observed historical data), as well as business relevance criteria (e.g. plausible ranges of level of influence) without human analyst supervision or exposure to historical data.

Still further, examples provide for a computer system to determine an optimal model for a user who can specify criteria for a complex domain, without need for the user to have understanding or knowledge of historical data used to calibrate or train the determined model(s).

The described system can create models significantly faster and with higher frequency than current human analyst-based approaches. In contrast to some conventional approaches, the user is not limited to a small and fine number of models with permutation variances, but rather can define new and existing relationships (or concepts and sub-concepts) for a particular domain.

Still further, a computer system as described with some examples can be used to create models that conform to complicated domain theories and objectives with higher quality than existing unsupervised machine-learning systems.

In some examples, a computer system can operate to determine a model in an environment where privacy concerns restrict access to the data by the user. For example, the computer system can operate in a data environment that preserves privacy and prevents data exchange or data leaks between different parties by executing autonomously on segregated computer systems. In such examples, no human user needs to have access to the historical datasets that are used to calibrate the models.

With reference to an example of FIG. 1, a set of observed data examples D 116 is provided relative to a database of records reflecting activity and/or behavior of a population of users. The population of users may be assumed to reside or otherwise be part of a target domain TD. The target domain TD may correspond to a real world data generating process (rwDGP) that is the subject of interest, research or investigation. Due to the impossibility of knowing the 'true' model of the world, the TD could be thought of as containing an unknown data generating process that creates a unique realization that can actually be observed, along with elements which may have played a causal role in it.

The interface 110 may be operated by a user, U. The user may assume someone wishes to gain insight from an unknown model M. By way of example, the target domain TD may correspond to consumer activity detected through a particular advertisement channel (e.g., television commercial or online campaign) or retail domain, and the user may correspond to a person who has interest in the advertisement or commercial activity of a particular item or brand. While the user may not have direct prior knowledge of the model M that is ultimately to be configured, the user's respective levels of certainty about the veracity of the data and the domain theory can influence the nature of the optimal model M that is selected by the system.

A domain theory DT, possibly containing errors, may be provided by the user to describe existing beliefs about a target domain TD. In at least some examples, the domain theory may be defined with data from a knowledge base 114. The knowledge base may include rules, conditions, and logical relationships which individually or collectively define a set of existing beliefs about a particular behavior or activity (or the rwDGP in the TD). Configuring the Domain Theory allows the User to introduce elements of their background knowledge into the system—knowledge about the domain that is separate from that specifically under study. The user may consider this knowledge to be relatively certain, rather than the subject of active evaluation. The configuration of the DT allows the user to define the set of hypotheses that they may elect to test in order to develop new knowledge in areas that they are less certain of. The user's theory might be based on, amongst things, other models, experience, empirical and theoretical literature and results from qualitative studies.

The user interface 110 enables a user to access system 100 as a network service (e.g., over the Internet, using a browser) or client-side software tool. The user interface 110 may include structure logic 112, to prompt a user for input that identifies a domain (e.g., retail sales, online advertisement), as well as posits or assumptions, and hypotheses which the user may want to evaluate, validate or otherwise test.

The user interface 110 can result in the generation of a specification 111 that identifies an objective, set of criteria and/or hypothesis which the user wishes to evaluate or test through an optimal predictive model. In some examples, the specification 111 defines an objective and/or hypotheses of the user in the context of a domain theory. The domain theory DT can be specific to a domain of real-world outcomes, for which at least some historical information is known. Still further, in some examples, the specification 111 defines a concept schema 113, corresponding to (i) a factor of causal influence (an independent variable) for an outcome of interest, (ii) a data set of real-world behaviors and activities, which may be influenced by the independent variable, and (iii) the outcome of interest that may be influenced by the independent variable. The concept schema 113 may be provided as concepts, sub-concepts, and logical relationships (e.g., rules between the concepts and sub-concepts). For a particular subject, the concept schema 113 provides an example of a domain theory.

In some examples, an initialization process generates numerous initial (and uncalibrated) models 109 for evaluation, based on the domain theory and the specification 111. A calibration component 124 may calibrate the initial set of models using an actual data set 125.

Figure 2:
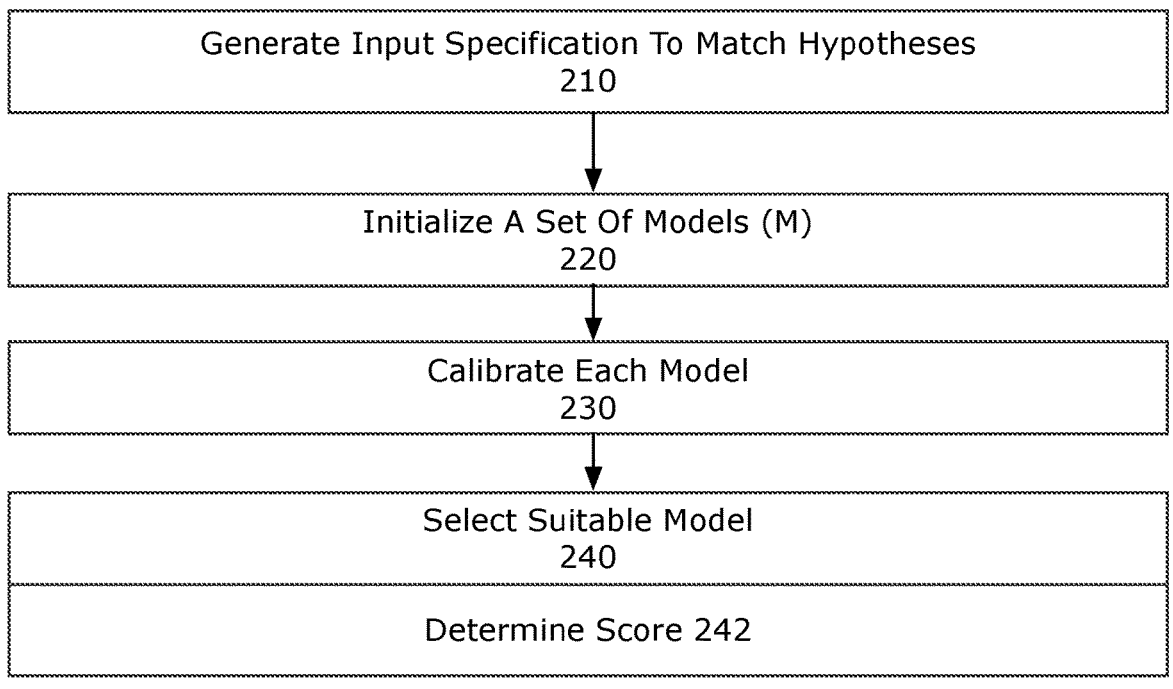
FIG. 2 illustrates an example model learning process for determining an optimal model for a domain target.
Figure 3:
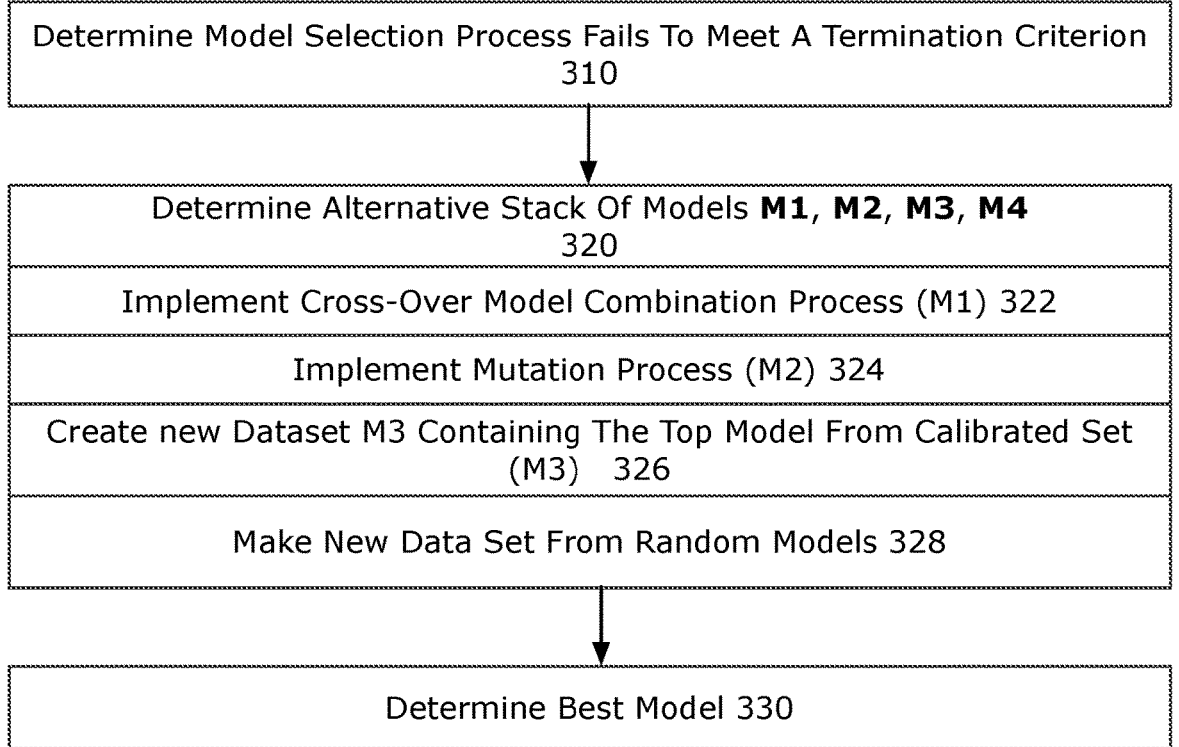
FIG. 3 illustrates an extension of a model learning process for determining an optimal model for a domain target.

A model selection 132 may make another selection from a calibrated set of models 121. The model selection 132 may implement a model search to select, construct or otherwise configure (e.g., with weights) an optimal or best model for the specification 111 of the user. FIG. 2 and FIG. 3 illustrate examples of how an optimal model may be selected. In some implementations, multiple suitable models are selected, then scored to determine a most optimal model.

The system 100 operates to determine which of multiple possible models M and permutations thereof are most suitable or optimal. An output of system 100 may correspond to a selected model 150. The user interface 110 may generate the specification 111 to include elements of a domain theory. From the specification 111, the models may be calibrated against real-world data 142 (D). A model may compare the model results to the real data, taking into account the model's fit and the degree of compliance with existing theory. In producing an output or selected model 150, the system 100 may also take into account a relative certainty about the veracity of the data and the target domain (D and DT), particularly as to whether the data and the domain theory provide a suitable or optimal overall representation for the user about the target domain TD.

Methodology

FIG. 2 illustrates an example method for selecting an optimal model, using a structured domain target. FIG. 3 illustrates an example method in which a model selection may be followed by a model alteration process. Methods such as described with an example of FIG. 2 and FIG. 3 may be implemented using a model selection system 100 such as shown with an example of FIG. 1. Accordingly, reference may be made to elements of FIG. 1 for purpose of illustrating a suitable component for performing a step or sub-step being described.

With reference to an example of FIG. 2, an input specification is obtained in accordance with a hypotheses of a user (210). The input may include user-provided parameters, which collectively define a domain theory DT. As described with other examples, the domain theory can be split into concepts and sub-concepts, with mappings and logical relationships that define independent and dependent variables, as well as relationships between such variables.

The system 100 may also combine a model selection process that varies the general structure of models with a statistical estimation process that sets specific model parameters. In one embodiment, the model selection process can be a classical machine learning algorithm, a genetic algorithm, an ant system or a simulated annealing algorithm. The statistical estimation could be logistic regression, linear regression or a general fit-maximizing optimization.

The system 100 may utilize the user specified parameters to initialize at initialization component 122, a set of models M (also termed first-generation models) (220). Note that a model at this point may have a number of un-calibrated coefficients. The domain theory may define concepts N and sub-concepts V. In one implementation, a matrix of U_PS rows and N columns is created, with each of the N columns representing one of the concepts from the Domain Theory, DT. The model may correspond to any one or more of an equation, a dependent variable specification, weights and a functional form which represents the relationship between them, with the other part of the equation present in the data, D. In some examples, the functional form might take a number of forms, both linear and nonlinear, for example log-log, linear, logistic.

Each model may be calibrated using a data set D (230). Calibration determines the values for formerly uncalibrated coefficients using the historical dataset. This calibration method is generally referred to as regression when implemented in a general form. The dataset D may include each of (i) a set of observations on a target domain (TD), the unknown, and rwDGP. The data set D may contain raw observations of elements in the process, as well as transformations of these elements that are intended to represent hypotheses about underlying behavioral response in the rwDGP. Such behavioral transformations may become new elements in the dataset, and different transformations of the same root concept can form sub-concepts. The dataset may include multiple data points which are individually defined a domain attribute, D(A,) which form columns, and an observation index D(,I) which define rows. Each of the I observation indexes may be associated with additional features, such as a timestamp, a geographic ID, a person-level identifier, or a combination of these. For example additional features might be mapped to the index as D(,1) [is_in] <Geo4>, D(,1) [is_observed_at]<'01:07:32 12-12-2015>.

The weights of a model M can be updated using a process of calibration. This involves searching the numeric parameter space of any given model specified by a sub-concept combination using a search procedure. For example, the calibration component 124 may utilize a numeric optimization algorithm, such as a limited-memory Broyden-Fletcher-Goldfarb-Shanno ("LBFGS") algorithm, to iteratively evaluate a series of possible weight values for a given combination of sub-concepts that collectively maximize an objective function.

In some examples, the objective function may be divided into two parts. A first part may correspond to absolute difference between the expected attribution defined in domain theory and the actual attribution that results from the model. This can be represented by the following:

$$\text{Absolute\_Attribution\_Deviance} = \sum_{i=1}^{n} \text{abs}(\text{exp\_att}(i) - \text{actual\_att}(i)) J, i)$$

A fit of the model may be determined, given proposed weights. The overall objective function for the model calibration is calculated based on a weighted sum of the fit and the absolute difference in the attribution, with the weights supplied by the user, as $$\text{Model\_Calibration\_Objective\_Function} = AAD\_W^* \text{Absolute\_Attribution\_Deviance} + F\_W^* \text{Fit}$$

The process may proceed iteratively until the convergence criterion is met. In one implementation, a set of default weights is used to initialize a search (or model selection process). An absolute deviance from the expected attribution is calculated. Additionally, a fit of the model is calculated. The overall objective function value is calculated. A numeric optimization algorithm, such as LBFGS is used to propose a new set of weights to maximize the objective function. This sub-process is repeated until convergence criteria is met. Once convergence criteria is met, the process is terminated.

Each set of sub-concepts defined in a row, a model M with an uncalibrated state is defined against the data attributes from the dataset D that are associated with the sub-concept through the maps_from relation as independent variables, and the data element from D identified in the maps_to relation in the Domain Theory as the dependent variable, and weights, fit and actual attribution set to zero. The calibration component 124 may repeat the process for each model and may be repeated using new weights, until convergence is determined. Once converged, calibration component 124 fits the model and sets the actual attribution to the calibrated values.

As described with an example of FIG. 1, the model selection component 132 may select a suitable model for predicting the hypotheses of the user (240).

In some variations, the model selection process can be based on scoring. The score logic 134 may determine model scores using, for example, a determination of model fit and compliance to expected attribution (242).

The fit (or fit calculation) may be based on empirical validation of a model (M). In some examples, the empirical validation may use real-time, or near real-time data (e.g., data that is minutes, hours, or days old) in order to validate the suitability of a particular model. As described with an example of FIG. 1, one or more interfaces 136 to real-world monitoring sources (e.g., online channels, broadcast channels) may be utilized to obtain the empirical data.

As an addition or alternative, system 100 may utilize sensitivity to calculate the actual attribution, actual_att, for each sub-concept involved in the model. Quantifying the component of the output which is attributable to each input factor can be achieved by systematically varying the parameter values and observing the impact on the model. The sensitivity analysis may decompose the variance of the output of the model into fractions which can be attributed to inputs or sets of inputs. For example, given a model with two inputs and one output, sensitivity analysis may show that 60% of the output variance is caused one input, and 40% by the second.

For a given model M and data D interaction:
For Each Row I in the Data D
   a. Define the total outcome tot_outcome as:

$$\text{Tot\_outcome} = \sum\nolimits_{i=1}^{n} D(A, i) i * M(J, i)$$

b. For each w(i) in the model, re-score the model with wi set to zero $$\text{act\_att}(i) = \text{tot\_outcome} - \sum\nolimits_{i=1}^{n} D(A, i) i * M(J, i)$$

Examples recognize that total space of models that can possibly explain the rwDGP, based on the DT includes all permutations of DT sub-concepts. The most likely combination of these sub-concepts is searched using a non-binary-alphabet genetic algorithm to maximize a fitness function expressed as an Overall Model Score (OMS). Examples recognize that a search of the total space of sub-concept permutations may involve a grid-search, such that it would be more efficient to use a search algorithm than conduct a grid search. For this application a non-binary alphabet seems appropriate, due to the exclusivity of some of the elements in the theory sets.

According to some examples, the models evaluated can be summarized by a score (e.g., OMS). The scoring logic 134 may, for example, determine the model's fit, and the deviation from expected attribution (242). In this way, a theoretical conflict between prior theory expressed in the TD and empirical evidence from the interaction of M and D is focused in the overall model score.

$$\text{Absolute Deviance from expected attribution} = \Sigma^{n}_{(i=1)} (\text{abs}(\text{exp\_att}(i) - \text{actual\_att}(i)), J, i)$$

$$\text{Model fit} = MAPE/AUC/r\text{-square}$$

The user may introduce their preferences for model fit and attribution compliance using the weights F_W and A_W:

$$OMS = \text{F\_W} * \text{Model\_fit} + \text{A\_W} *$$

AbsoluteDevianceFromExpectedAttribution

The OverallModelScore is therefore a weighted combination of the set of scoring criteria applied. If the Model_fit criteria was valued above the AbsoluteDevianceFromExpectedAttribution score, the weights given to each of the factors AW and CW can be adjusted to reflect their perceived importance.

The set of models associated with the initial set may be sorted in descending order such that the models with the highest overall model score at the top. According to some examples, alternative model selection processes or mechanisms may be used to select one model over another. In some variations, a selected set of models are combined using one or more possible model combination processes.

With reference to an example of FIG. 3, an adaptive learning process is described in connection with determining a model. The adaptive learning process may use a genetic algorithm, as described with FIG. 4A through FIG. 4C. In more detail, system 100 makes a determination that a model selection process fails to meet a termination criterion (310). According to some examples, the system 100 may initiate a model selection process using a set of models for which future crossover and mutation operations can operate against. The system 100 may create the initial model by randomly instantiating each concept group with one of the sub-concepts.

Figure 4A:
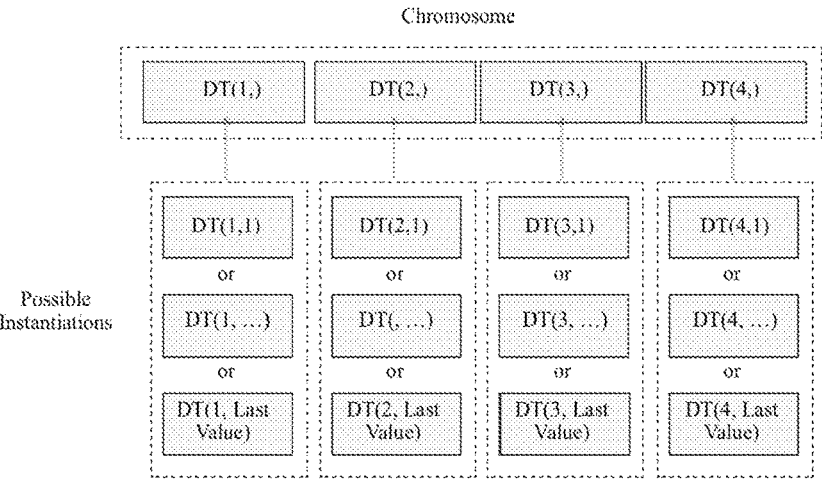
FIG. 4A through FIG. 4C illustrate representations of one or multiple model alteration processes.

FIG. 4A illustrates a representation of a model in which concepts and sub-concepts are represented by lineage and chromosomes. As described below in greater detail, a gene in the chromosome can be instantiated with a sub-concept that is associated with a particular concept group. A gene represents a sub-concept, and the element that replaces it as part of the crossover or mutation operations are part of the same concept group.

Figure 4B:
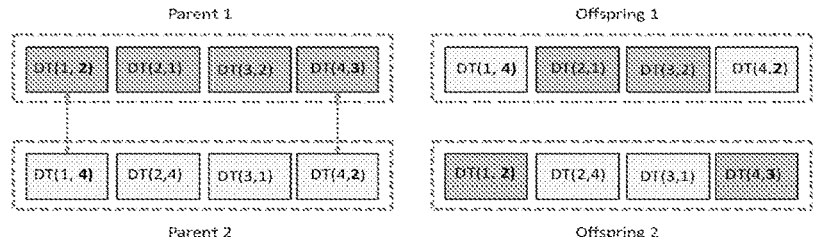

In response, the system 100 may operate to determine an alternative stack of models M1, M2, M3, and M4 (320). In one variation, a cross-over model combination process is implemented (322). In the cross-over combination process, the characteristics of two parent chromosomes to form offspring by exchanging some of their features. FIG. 4B illustrates a representation of a model in which concepts and sub-concepts are subjected to a cross-over operation. In one example, a new dataset M1 is defined, with a first threshold (e.g., the top 20% of models) being selected from the calibrated set of models. The selection for cross-over may be random.

Figure 4C:
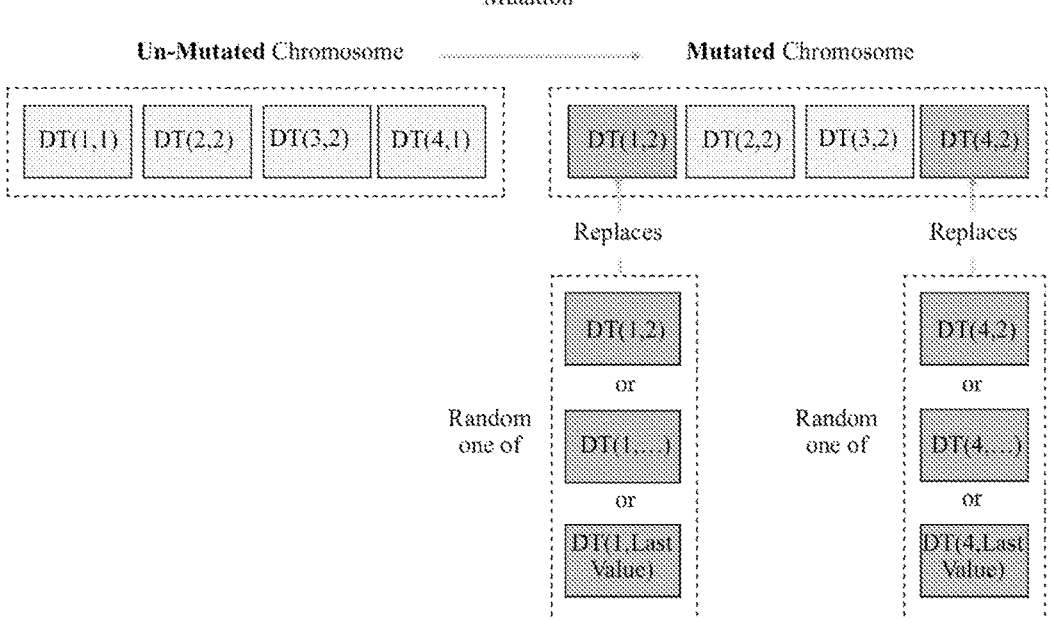

In another variation, system 100 implements a mutation process to form a model M2 by altering one or more selected models (324). Specifically, mutation changes may be made to characteristics of a particular chromosome by randomly altering some of the features with a probability equal to the mutation rate. Mutation may have the effect of adding extra variability into the population. FIG. 4C illustrates a representation of a model in which sub-concepts are subjected to a mutation. The system 100 may define a new data set M2, where a second threshold (e.g., the top 30%) of models are selected the initial set and then subjected to mutation.

For comparison, the system may also create a new dataset M3 containing the top model from the calibrated set (326). As an addition or alternative, a new dataset M4 is created which contains a set of random models U_PS*50, defined using the initialization process (328). In this way, the system 100 may operate to initiate the alternative stack of models. M1, M2, M3 and M4 may be stacked to form another set of models G(i+1), a matrix of U_PS rows and N columns, with each of the N columns representing one of the concepts from the domain theory, DT. This is repeated until convergence criteria is met. The termination criterion fails, the steps are repeated until a best (e.g., most optimal) model is determined (330). The determined model can be used to provide the predictive outcome desired by the user operating the user interface 110 of the system 100. Through implementation of a process as described, system 100 can adapt and learn a model.

Computer System

Figure 5:
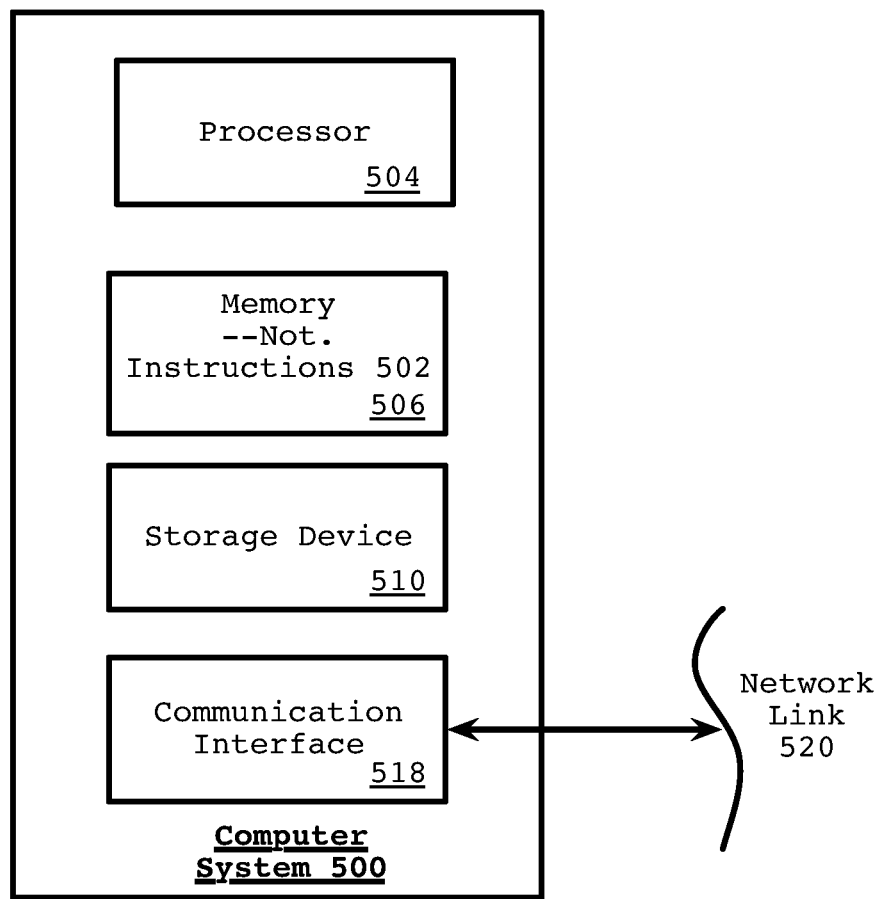
FIG. 5 illustrates a computer system on which one or more examples may be implemented.

FIG. 5 is a block diagram that illustrates a computer system upon which aspects described herein may be implemented. For example, in the context of FIG. 1, system 100 may be implemented using one or more servers such as described by FIG. 5. Likewise, methods such as described with examples of FIG. 2 and FIG. 3 may be implemented using an example such as described with FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many mobile phones and consumer electronic devices) and magnetic memory. Computers, terminals, network enabled devices (e.g., mobile devices such as mobile phones) are all examples of machines and devices that utilize processors, memory, and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer implemented method for determining a model, the method comprising:
   (a) identifying, by one or more computing devices, a schema that defines a possible causal element of a particular type of behavior;
   (b) determining, by the one or more computing devices, one or more concepts provided in the schema, and one or more sub-concepts for each concept, each concept and sub-concept being associated with uncalibrated weights and a functional form which represent a logical relationship between them;

(c) determining, by the one or more computing devices, multiple models from the one or more concepts and the one or more sub-concepts;

(d) calibrating, by the one or more computing devices, the multiple models using representative data collected through a monitoring channel from a real-world source, wherein the representative data is inaccessible to a user;

(e) updating the multiple models with weights to determine an optimal model amongst a plurality of calibrated models;

(f) determining, by the one or more computing devices, the optimal model amongst the plurality of calibrated models, wherein determining the optimal model includes adaptively learning the optimal model by repeating (c) and (d) to converge on the optimal model; and (g) transmitting, by the one or more computing devices, the optimal model to a user interface to thereby support measurement of marketing effectiveness in response to one or more stimuli in a marketplace.

2. The method of claim 1, wherein identifying the schema includes identifying an independent variable.

3. The method of claim 1, wherein the schema is associated with a termination threshold.

4. The method of claim 3, further comprising:

after calibrating the multiple models, making a determination as to whether the multiple models satisfy the termination threshold.

5. The method of claim 1, wherein determining the optimal model includes selecting the optimal model from the plurality of calibrated models.

6. The method of claim 1, determining, by the one or more computing devices, a model score, wherein the model score is based on a model fit to a real-world result.

7. The method of claim 1, wherein the one or more concepts are based on one or more rules that are specific to a domain threshold.

8. The method of claim 1, wherein a user identifies the schema by mapping real-world data to each of a dependent and independent variable.

9. The method of claim 1, wherein the determining the optimal model includes using a genetic algorithm.

10. The method of claim 1, wherein (d) is performed using a statistical process.

11. The method of claim 1, further comprising determining an alternative model by forming a cross-over combination of at least two of the plurality of calibrated models, the forming including exchanging at least one feature of the at least two of the plurality of calibrated models to form the alternative model.

12. The method of claim 1, further comprising determining an alternative model by using a mutation process, wherein one or more features of at least one of the plurality of calibrated models are randomly altered with a probability equal to a mutation rate.

13. The method of claim 1, further comprising adjusting a marketing activity based on the optimal model.

14. The method of claim 1, further comprising calibrating the multiple models using representative data in real-time from when it is collected through the monitoring channel.

* * * * *